(12) United States Patent
Baser (10) Patent No.: US 12,325,198 B2
(45) Date of Patent: Jun. 10, 2025

(54) METHOD OF MANUFACTURING A COMPOSITE PART COMPRISING A CORE AND UHMWPE SKIN REGIONS

(71) Applicant: MITSUBISHI CHEMICAL ADVANCED MATERIALS COMPOSITES AG, Lenzburg (CH)

(72) Inventor: Burak Baser, Aarburg (CH)

(73) Assignee: Mitsubishi Chemical Advanced Materials Composites AG, Lenzburg (CH)

(*) Notice: Subject to any disclaimer, the term of this patent is extended or adjusted under 35 U.S.C. 154(b) by 0 days.

(21) Appl. No.: 18/319,562

(22) Filed: May 18, 2023

(65) Prior Publication Data

US 2023/0286224 A1 Sep. 14, 2023

Related U.S. Application Data

(63) Continuation of application No. 16/753,975, filed as application No. PCT/EP2018/077371 on Oct. 8, 2018, now abandoned.

(30) Foreign Application Priority Data

Oct. 6, 2017 (EP) ..................................... 17195107

(51) Int. Cl.
*B29C 70/12* (2006.01)
*B29C 43/00* (2006.01)
(Continued)

(52) U.S. Cl.
CPC ............. *B29C 70/12* (2013.01); *B29C 43/003* (2013.01); *B29C 43/18* (2013.01); *B29C 43/52* (2013.01);
(Continued)

(58) Field of Classification Search
CPC .... B29C 43/18; B29C 2043/189; B29C 70/84
See application file for complete search history.

(56) References Cited

U.S. PATENT DOCUMENTS 3,765,973 A * 10/1973 Kramer ............... B29C 66/3024
156/73.1
3,883,631 A * 5/1975 Murray ................. B29C 48/793
264/237
(Continued)

FOREIGN PATENT DOCUMENTS

CN 102580159 A * 7/2012
JP 2003025523 A * 1/2003

*Primary Examiner* — Benjamin A Schiffman
(74) *Attorney, Agent, or Firm* — BROOKS KUSHMAN P.C.

(57) ABSTRACT

A method of manufacturing a composite part comprising a core and at least one skin region formed of a low friction UHMWPE skin polymer attached thereto, by: a) providing a mold with a heatable mold cavity; b) loading into the mold cavity UHMWPE powder followed by a core element having a surface with at least one contacting region provided with a plurality of anchoring sites, loading onto the core element, a layer of UHMWPE in powder form adjacent the contacting region, and applying a heat pressing step to melt the skin polymer powder to form a molten skin polymer matrix, and cooling to solidify the skin polymer matrix forming a skin region mechanically engaged into anchoring sites of the core element.

13 Claims, 6 Drawing Sheets (51) Int. Cl.
  *B29C 43/18* (2006.01)
  *B29C 43/52* (2006.01)
  *B29C 70/46* (2006.01)
  *B29C 70/84* (2006.01)
  *B29K 101/12* (2006.01)
  *B29K 105/00* (2006.01)
  *B29K 105/12* (2006.01)
  *B29K 223/00* (2006.01)
  *B29K 301/12* (2006.01)
  *B29K 309/08* (2006.01)

(52) U.S. Cl.
  CPC ............ B29C 70/465 (2013.01); B29C 70/84 (2013.01); *B29C 2043/189* (2013.01); *B29K 2101/12* (2013.01); *B29K 2105/12* (2013.01); *B29K 2105/128* (2013.01); *B29K 2105/251* (2013.01); *B29K 2223/12* (2013.01); *B29K 2301/12* (2013.01); *B29K 2309/08* (2013.01); *B29K 2823/0683* (2013.01)

(56) References Cited

U.S. PATENT DOCUMENTS

| | | | | |
|---|---|---|---|---|
| 3,887,319 A * | 6/1975 | Cottingham | .......... | B29C 48/022 425/207 |
| 4,124,676 A * | 11/1978 | Henzl | .............. | B29C 45/14311 264/250 |
| 4,735,753 A * | 4/1988 | Ackermann | ............ | B29C 43/18 264/479 |
| 4,818,205 A * | 4/1989 | Burke | ................ | A44B 17/0035 425/117 |
| 4,944,974 A * | 7/1990 | Zachariades | ................ | C08J 9/28 428/36.1 |
| 5,160,472 A * | 11/1992 | Zachariades | ................ | C08J 9/28 264/258 |
| 5,269,860 A * | 12/1993 | Rice | .................... | B29C 66/8322 156/73.2 |
| 5,286,576 A * | 2/1994 | Srail | ....................... | B32B 27/18 428/297.4 |
| 6,758,997 B1 * | 7/2004 | Mao | .................... | B29C 45/1671 264/254 |
| 8,420,197 B2 * | 4/2013 | Giraud | ................ | B29C 45/1657 428/58 |
| 2001/0026863 A1 * | 10/2001 | Hirano | ................... | B29C 43/18 264/273 |
| 2005/0287891 A1 * | 12/2005 | Park | ........................ | B32B 27/32 442/366 |
| 2007/0237942 A1 * | 10/2007 | Linker | ................... | B32B 37/04 428/309.9 |
| 2015/0030804 A1 * | 1/2015 | Baser | .................... | B32B 27/288 428/114 |
| 2015/0044438 A1 * | 2/2015 | Baser | .................... | D04H 3/105 156/243 |

\* cited by examiner

METHOD OF MANUFACTURING A COMPOSITE PART COMPRISING A CORE AND UHMWPE SKIN REGIONS

CROSS-REFERENCE TO RELATED APPLICATIONS

This application is a continuation of U.S. application Ser. No. 16/753,975 filed Apr. 6, 2020, which is the U.S. national phase of PCT Application No. PCT/EP2018/077371 filed on Oct. 8, 2018, which claims priority to EP patent application Ser. No. 17/195,107.2 filed on Oct. 6, 2017, the disclosures of which are incorporated in their entirety by reference herein.

TECHNICAL FIELD

The present invention relates to a novel method of manufacturing a composite part comprising a core and at least one skin region formed of a skin thermoplastic polymer attached thereto. Moreover, the invention relates to a composite part comprising a core element and at least one skin region formed of a skin thermoplastic polymer attached thereto.

BACKGROUND

Conventional polyethylene polymers, i.e. low and high density polyethylene, are waxy solids not known for exceptional strength properties. Due to their relative softness, while generally lubricious, they are easily abraded. Ultra high molecular weight polyethylene, also known as "UHMWPE", on the other hand, is an exceptionally strong and durable polymer totally unlike its poorer relatives.

UHMWPE is prepared by special polymerization processes in which the polyethylene chains acquire an exceptionally high molecular weight, typically having number average molecular weights of from $1.5 \times 10^6$ to $1 \times 10^7$ daltons, supplied as a resin powder. It is their very long polymer chains which make these polymers unique. However, this same feature is also the cause of major processing problems. While ordinary polyethylene even including polyethylene of very high molecular weight can be melt extruded, attempts to melt extrude UHMWPE have been largely unsuccessful, despite much research in this area. Virtually all UHMWPE products are produced by compression molding or ram extrusion. As indicated by U.S. Pat. No. 5,286,576, processing methods applicable to conventional thermoplastics, such as continuous extrusion, calendaring, and injection molding, are generally inapplicable to UHMWPE.

The problems associated with processing of UHMWPE are due in part to the gel-like nature of the polymer above its crystalline melt temperature, roughly 135° C. to 150° C. While ordinary polyethylene is a viscous, molasses-consistency liquid at such temperatures, UHMWPE is a swollen gel which has an extremely high viscosity, and which exerts exceptional frictional stress against the walls of extruders and the like. The problems associated with UHMWPE are described quite clearly by U.S. Pat. Nos. 3,883,631, 3,887, 319. For the reasons discussed therein, ram extrusion and compression molding have thus far been the only processes of producing UHMWPE products which are used extensively.

In compression molding. UHMWPE powder is introduced into a coffin-like mold of very thick section. A thick cover which fits within the mold cavity is then placed on top of the powder, and the whole assembly is heated to above the crystalline melt temperature while being compressed to very high pressure. The molds are then slowly and uniformly cooled, and the product, generally in the form of a thick slab, is demolded. As can be seen, compression molding is a cost-intensive and labor intensive method of producing UHMWPE products. However, it is essentially the only process which can be used to make panels or sheets of large width, and is thus still a much used process.

In contrast to the high wear resistance and excellent sliding properties resulting from its very low friction coefficient, UHWMPE has low stiffness with an E-modulus typically ranging from 500 to 1,000 MPa. Accordingly, UHMWPE cannot be used integrally as structural parts and needs to be applied as lining. In other words, structural parts are built starting from a mechanically performant structure made e.g. of steel, wood or other polymers, which is then lined with UHMWPE in a secondary operation.

It should be noted that UHMWPE cannot be reinforced simply by incorporating reinforcement fibers, since adhesion of UHMWPE to reinforcement fibers is very poor.

It would thus be desirable to provide an improved method of manufacturing composite parts comprising a mechanically performant core and at least one skin region made of UHMWPE or of another low-surface-energy thermoplastic polymer attached to a face region of the core.

SUMMARY

According to one aspect of the invention, there is provided a method of manufacturing a composite part comprising a core and at least one skin region formed of a skin polymer attached thereto, the skin polymer being a low surface energy thermoplastic polymer, the method comprising the following steps:

a) providing a mold with a heatable mold cavity;
b) loading into the mold cavity a core element having a surface with at least one contacting region provided with a plurality of anchoring sites, and—previously or subsequently—loading into the mold cavity a layer of the skin polymer in powder form adjacent said contacting region and embedding the anchoring sites;
c) applying a heat pressing step whereby the skin polymer powder is molten to form a molten skin polymer matrix;
d) applying a cooling step, whereby the skin polymer matrix solidifies to form a skin region mechanically engaged into the anchoring sites of the core element forming the core.

It was surprisingly found that application of the skin polymer in powder form so as to embed the anchoring sites by the polymer powder allows the development of a much improved mechanical coupling between skin regions and core.

According to another aspect, there is provided a composite part comprising a core and at least one skin region formed of a skin polymer attached thereto, the skin polymer being a low surface energy thermoplastic polymer, the core element having a surface with at least one contacting region provided with a plurality of anchoring sites and the skin region being mechanically engaged into the anchoring sites of the core element, the skin region having a thickness of 0.5 to 10 mm.

The method allows production of lightweight composite parts with excellent surface properties of the skin region.

In the present context, the term "low surface energy thermoplastic polymer" shall be understood as a polymer having very poor adhesion to reinforcement fibers (e.g. to glass-, carbon-or aramid fibers), especially UHMWPE, polytetrafluorethylene (PTFE), polyvinylidene fluoride (PVDF) and polychlorotrifluoroethylene (PCFTE) so that fiber reinforcement is provided by using a fiber reinforced core with different polymer having sufficient adhesion to the fibers and thus providing high mechanical performance. It is known that low surface energy polymers such as UHMWPE resp. PTFE with high molecular weight have very low flowability. Therefore it is important that in accordance with the present invention skin polymer powders trickles or otherwise enters and embeds the surface anchoring sites before melting occurs during the heat pressing step.

The term "mold with a heatable mold cavity" shall be understood in its broadest sense as generally used in the field of thermoplastic processing. In particular, the mold may be a non-structured mold with two cooperating, substantially planar or slightly bent mold surfaces. Horizontally closing molds will be preferable for the reasons explained below, but this shall not exclude the use of vertically closing molds in principle.

It will also be understood that the dimensions of the core element and the amount of skin polymer to be loaded into the mold cavity shall reasonably match the dimensions of the mold cavity so as to allow carrying out the heat pressing step and providing the required reinforcement.

In accordance with the present invention, the core element to be provided with the skin region shall have on its outer surface at least one contacting region provided with a plurality of anchoring sites. The latter are intended to provide a mechanical anchoring or gripping engagement zone for the skin polymer. The latter is supplied in powder form, and for a good result it will be necessary to ensure that all of the contacting zones are sufficiently contacted with the powder. In particular, the skin polymer powder shall penetrate into any cavities defined by the anchoring sites as uniformly and thoroughly as possible. For this purpose, it may be appropriate to apply a vibrating or shaking motion to the filled mold. When spreading skin polymer powder over the top of the core element, it will be useful to use appropriate powder dispenser means. In simple terms, loading of the mold cavity before carrying out the heat pressing step may include any of the following steps:

- spreading an appropriate amount of skin polymer powder onto the upper surface of the lower mold element, thereby forming a powder bed;
- placing the core element onto the powder bed;
- optionally subjecting the core element to vibration or wiggling motion so as to load skin polymer powder onto any contacting zones at the bottom side of the core element;
- spreading a further appropriate amount of skin polymer powder onto the upper surface of the core element;
- optionally subjecting the core element to vibration or wiggling motion so as to cause skin polymer powder to fall into any cavities of contacting zones at the upper side of the core element;
- loading further skin polymer powder into peripheral regions surrounding the core element is a full embedding with skin polymer is intended.

An "appropriate amount" of skin polymer powder is an amount that allows formation of a molten skin layer with a predetermined thickness.

After the mold cavity has been duly loaded and, in particular, the skin polymer powder has penetrated any core surface cavities forming anchoring sites of the contacting zone as intimately and thoroughly as possible, a heat pressing step is applied which causes the skin polymer powder to melt and form a molten skin polymer matrix. In general, this will require heating to appropriate processing temperature, and it will also require substantial pressure to effectively compactify the entire skin region.

In the subsequent cooling step the molten skin polymer matrix is caused to solidify. Any parts of the matrix that had penetrated into cavities and recesses of the core element will then be mechanically engaged and thus provide the desired anchoring of the skin region and the core.

In the present context, the term "core element" will be used for the initial structure that is placed into the mold cavity. Depending on the type of core element, the heat pressing step will or will not lead to a change of the core element's properties and shape. In particular, if the core element comprises some type of thermoplastic polymer, henceforth called "core thermoplastic polymer", the heat pressing will lead to a melting and rearrangement not only of the skin polymer, but also of the core element. For this reason, the term "core" will generally be used for the region that was originally the core element before the heat pressing treatment. It will be understood that the core may be substantially identical to the core element or it may be a somehow re-shaped version of the original core element. It will also be understood that the core element shall be of a material and configuration in which the polymer chains are not degraded by the conditions prevailing during the heat pressing step.

The singular form "core element" also includes the possibilities of multiple core elements arranged either coplanarly or in a stacked manner. In the latter case, the so-called skin region may extend to regions between stacked core elements.

Advantageous embodiments are defined in the dependent claims and described in the examples further below.

The principles of the present invention are applicable for a number of low surface energy polymers available in powder form. According to a particularly advantageous embodiment (claims 2 and 13), the skin polymer is ultra-high molecular weight polyethylene (UHMWPE). In the present context, UHWMPE is defined as having number average molecular weights of from $1.5 \times 10^6$ to $1 \times 10^7$ daltons. UHWMPE also includes those polymers defined in ASTM D4020-05; D6712-01; and ISO 11542-2. While generally homopolymeric in nature, UHMWPE also includes copolymers having limited amounts of other copolymerizable comonomers. In the case of copolymer UHMWPE, the aforementioned ASTM and ISO requirements should be met.

The term "skin" shall be understood in its broadest terms as referring to a surface layer attached to an inner or core structure. According to one embodiment, the layer of skin polymer is applied to one face of the core element, i.e. either above or below the core element. For such a one-sided configuration, it may be preferable to first insert the core element into the mold cavity and to then distribute the skin polymer powder onto the core element from above. For such a configuration a horizontally closing mold is advantageous.

According to a further embodiment, the layer of skin polymer powder is applied above and below the core element so as to form a sandwich-type composite part. The upper and lower skin regions thus formed may or may not have equal thickness.

According to yet another embodiment, the core may be completely surrounded by the skin region.

According to another embodiment, the layer of skin polymer powder is applied patchwise. This includes the application of just one patch region, e.g. a rectangular or square patch to one side of the core, but also the application of multiple patch regions. For such embodiments, it is possible to configure the core element just with appropriately located contacting regions. Alternatively, an entire face or even the entire surface of the core element may be configured as a contacting region, in which case the patch-wise skin configuration will be determined by appropriately localized application of skin polymer.

According to a particularly advantageous embodiment, the core element is formed of a thermoplastic fleece with reinforcement fibers, wherein the thermoplastic fleece consists of a core thermoplastic polymer. Fiber reinforced thermoplastic fleece materials are widely used in manifold technical areas, particularly for producing lightweight form parts with advantageous structural properties. In the context of the present invention, the thermoplastic fleece and—depending on type—also the reinforcement fibers incorporated therein, provide an irregular surface region with protruding thermoplastic and/or reinforcement fiber portions and open or cavernous regions therebetween. The protruding portions can be end portions of thermoplastic or reinforcement fibers, but they can also be loop like protrusion sections of a long fiber element. In any case, the heat pressing step will cause melting of both the skin polymer and the core thermoplastic polymer, whereby the core element is formed into the core. Any surface cavities which were initially filled with skin polymer powder will be filled with molten skin polymer trapped against reinforcement fiber portions and embedded in finger-like regions of molten core thermoplastic polymer. Subsequent cooling will form an intricately connected boundary region of solidified skin polymer and core thermoplastic polymer.

The core thermoplastic polymer can be selected from a variety of known polymers such as e.g. polyamide (PA), polypropylene (PP), polyphenylene sulfide (PPS), polyetherimide (PEI) and polyetheretherketone (PEEK) The melting temperature of the core thermoplastic polymer should be sufficiently low so that the press heating, which is conducted at temperature adapted to the skin polymer, leads to melting of the core thermoplastic polymer. For example, if using PTFE as skin polymer, suitable core polymers appear to be e.g. PPS, PEI and PEEK. If using UHMWPE as skin polymer, the suitable core polymers notably include PP.

According to one embodiment, the core thermoplastic polymer is polypropylene, preferably a polypropylene with a melt flow index MFI (230° C., 2.16 kg) of 5 to 500, preferably of 10- to 200 g/10 min.

According to a further embodiment, the skin polymer is UHMWPE and the heat pressing step is carried out at a temperature of 190 to 230° C. with a pressure of 20 to 60 bar.

As also known in the field of fiber reinforced thermoplastics, the reinforcement fibers can be selected from a large variety, including but not limited to glass fibers, carbon fibers, aramid fibers and basalt fibers. Alternatively, the reinforcement fibers may be made of a high-melting thermoplastic, i.e. from a material that does not melt at the processing temperatures of the heat pressing step. According to an advantageous embodiment, the reinforcement fibers are glass fibers.

As also known from the field of fiber reinforced thermoplastics, the core element formed of a thermoplastic fleece with reinforcement fibers may comprise structural reinforcement elements. Therefore, according to one embodiment, the core element further comprises at least one reinforcement layer. In certain embodiments, the reinforcement layer is selected from a fabric, a multiaxial stitch or unidirectional reinforcement.

According to yet another embodiment, the core element is formed as a solid or hollow body wherein the anchoring sites are configured as surface discontinuities such as recesses, rims or undercuts. The size of such discontinuities shall be large enough to allow easy penetration by skin polymer powder dispersed thereon. Examples of bodies suitable as core elements of the present invention are simple plates or rods, but also hollow profiles such as tubes. The anchoring sites may be formed by appropriate surface treatment, which can include sand or glass bead blasting. In addition, additional anchoring may be provided by applying a suitable coupling agent, e.g. a thin layer of olefin based adhesive, onto the sur-face of the core element.

According to an advantageous embodiment of the composite part, wherein the core comprises a solid matrix of the core thermoplastic and reinforcement fibers, which together form anchoring sites embedded by the skin polymer.

BRIEF DESCRIPTION OF THE DRAWINGS

The above mentioned and other features and objects of this invention and the manner of achieving them will become more apparent and this invention itself will be better understood by reference to the following description of various embodiments of this invention taken in conjunction with the accompanying drawings, wherein:

FIGS. 1 to 4 show various embodiments of the invention as schematic vertical section views through the composite part, wherein in each figure, a) shows the situation before applying the skin polymer to the core element, b) shows the situation after applying the skin polymer and distributing the same within surface structures of the core element, and c) shows the situation after the heat pressing step, including an enlarged portion of a segment at the upper left of the composite part;

DETAILED DESCRIPTION

It will be understood that the figures are not necessarily drawn to scale. In some instances, relative dimensions are substantially distorted for ease of visualization. Identical or corresponding features in the various figures will generally be denoted with the same reference numerals.

In the following examples, UHMWPE was used as skin polymer, polypropylene was used as core thermoplastic polymer, and glass fibers were used as reinforcement fibers. As will be understood from the above, other suitable materials may be chosen. Depending on material choice, the temperature and possibly also the pressure applied in the heat pressing step may have to be adapted. For this purpose it may be appropriate to conduct a small series of test runs systematically changing temperature and pressure.

Figure 1A:
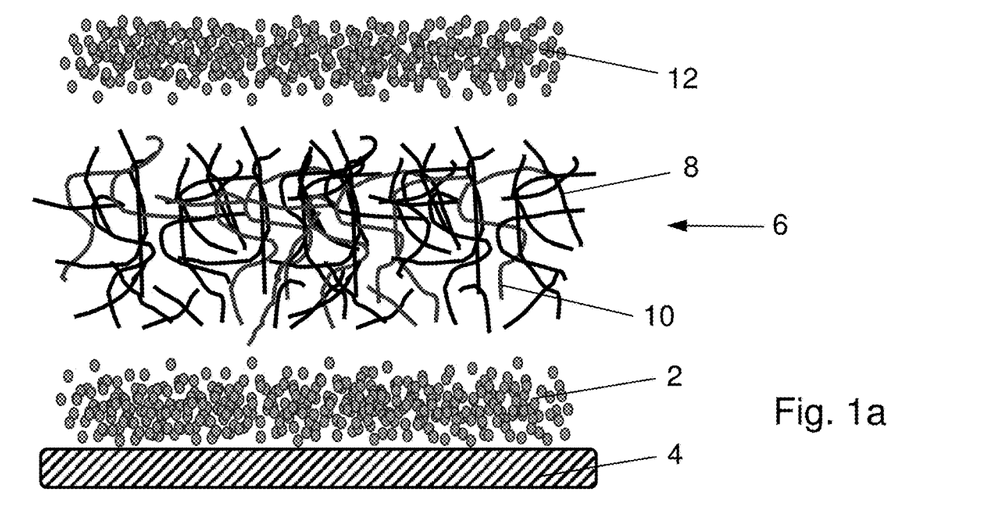
Figure 1B:
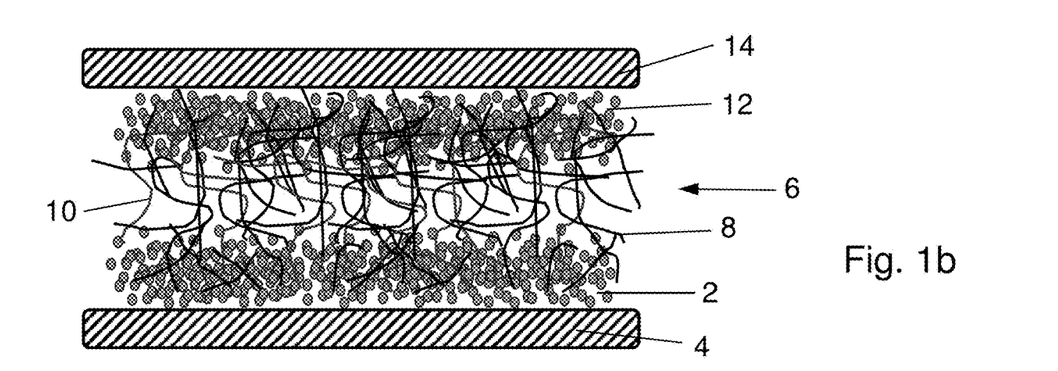
Figure 1C:
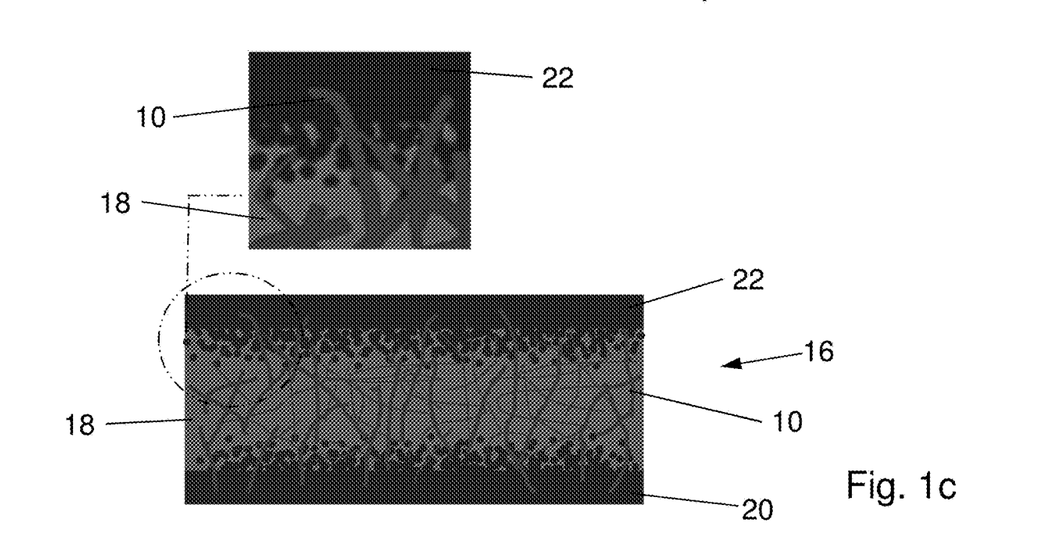

In the example of FIG. 1, a first layer 2 of approximately 2 mm of UHMWPE in powder form is uniformly distributed on a lower mold plate 4 of a heatable mold cavity (not shown). Subsequently, a core element 6 formed of a lofty mat comprising a thermoplastic fleece 8 containing reinforcement fibers 10, e.g. with 20 to 80% by weight of randomly oriented polypropylene (PP) fibers and 80 to 20% by weight of glass fibers is placed onto the first layer 2 of skin polymer powder. Thereafter second layer 12 of approximately 2 mm of UHMWPE in powder form is uniformly distributed onto the top of the core element 6. As seen from FIG. 1b, at this point a fraction of the skin polymer powder has penetrated into interstitial regions between the various PP and glass fibers in the regions near the surface of the core element.

The stacked arrangement thus prepared is then subjected to a heat pressing step by driving an upper mold plate 14 against lower mold plate 4 under appropriate heating. During this process, the UHMWPE powder is driven further into the core element and is caused to melt; simultaneously, the PP fibers of the core element are caused to also melt and the lofty fiber arrangement is compressed to some extent. After cooling down, the resulting composite part comprises a central core made up of glass fibers 10 and a solid PP core matrix 18, which is stacked be-tween a lower skin 20 and an upper skin 22 formed of a solid matrix of UWHMPE. As particularly seen from the enlarged section in FIG. 1c. the boundary region be-tween skin and core regions comprises an arrangement of geometrically inter-twined regions of solidified PP, solidified UHMWPE and glass fiber portions, thus providing an strong mechanical coupling of the various layers.

The same principle is applied in the examples of FIGS. 2 and 3, and therefore only the respective difference will be discussed.

Figure 2A:
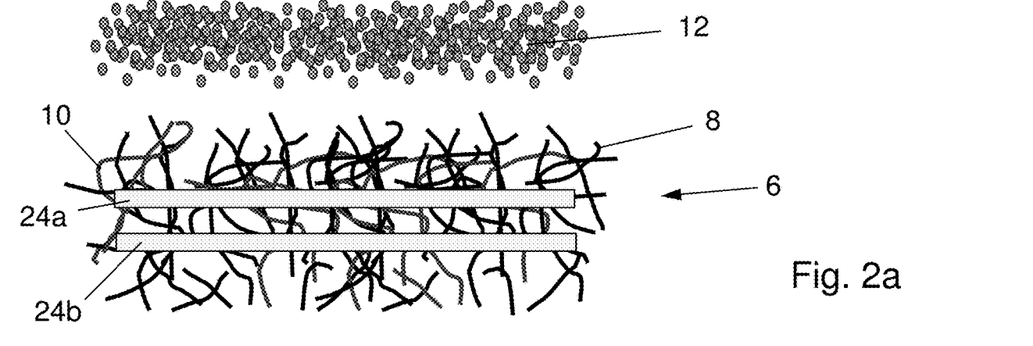
Figure 2B:
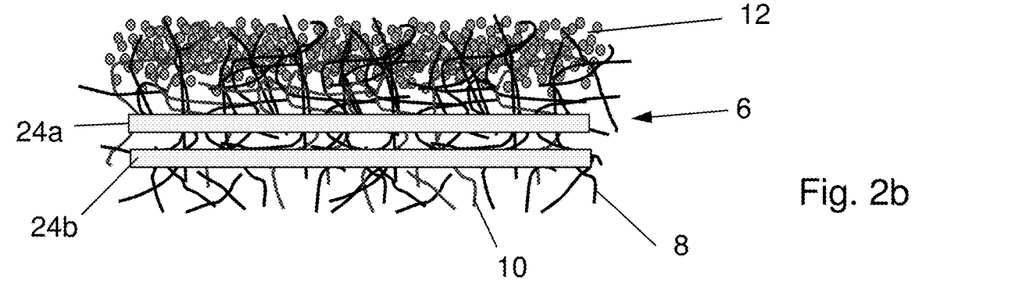
Figure 2C:
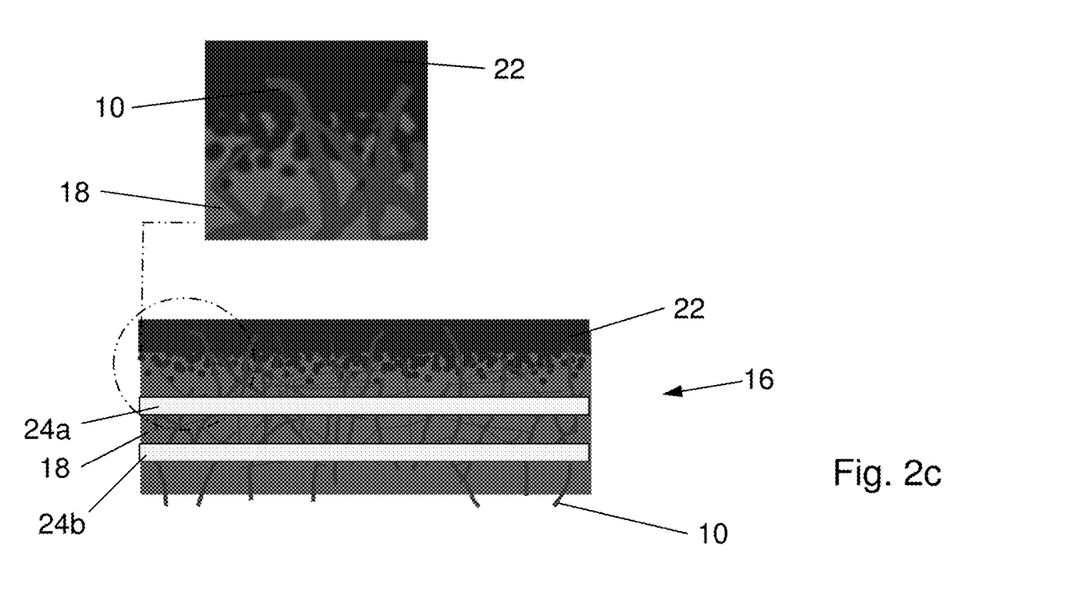

In the example of FIG. 2, only an upper skin layer 12 is applied. Moreover, the core element 6 contains, in addition of PP fibers 8 and glass fibers 10, two internal reinforcement layers 24a and 24b. These reinforcement layers can be formed, e.g., of a reinforcement fabric or a multi-axial or unidirectional reinforcement layer. Such reinforcement layers are well known in the field of fiber reinforced thermoplastics. Alternatively, one could also use a plate-like solid element for reinforcement.

Analogously to the first example, the heat pressing step leads to formation of a composite part, wherein the core 16 now contains the reinforcement layers 24a and 24b. Depending on the type of reinforcement element, molten PP is driven into recesses and cavities of the reinforcement element and provides mechanical connection to the core matrix.

Figure 3A:
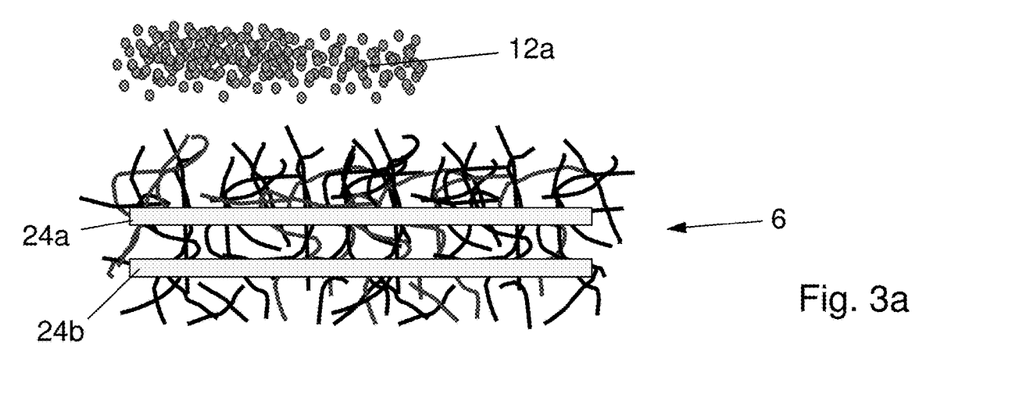
Figure 3B:
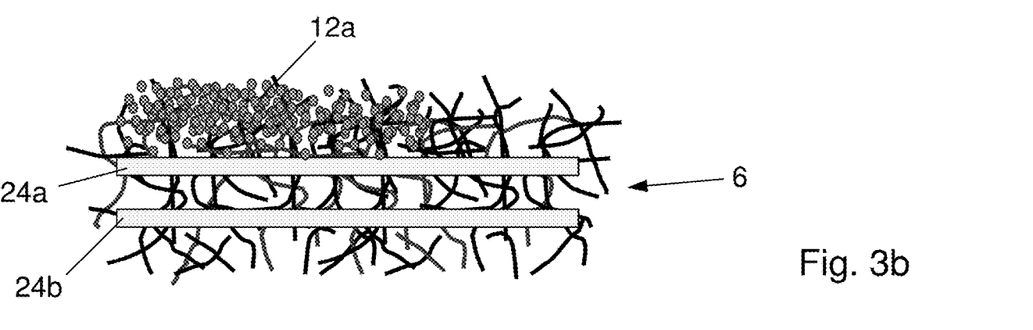
Figure 3C:
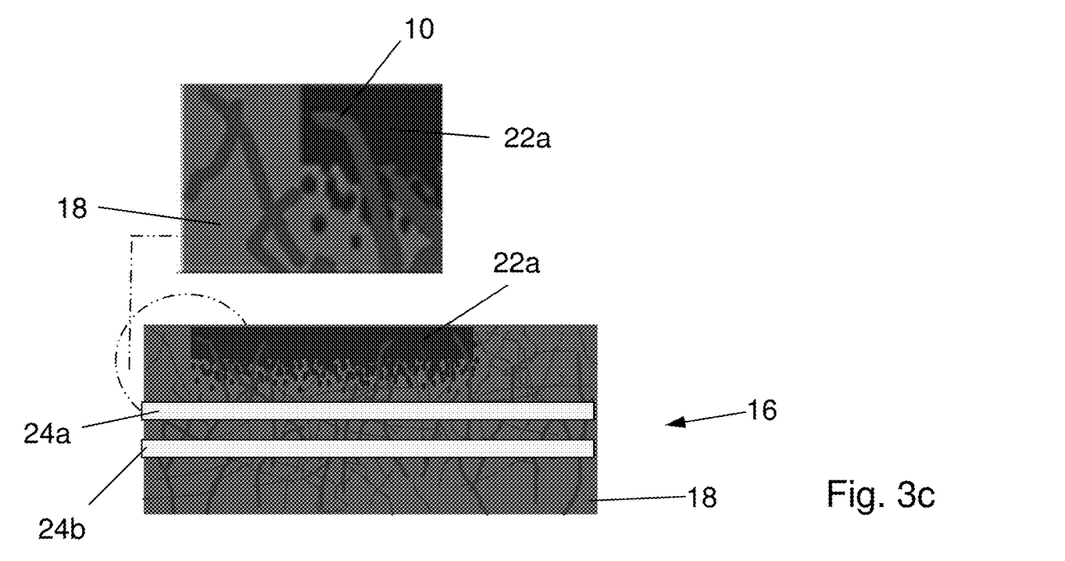
Figure 4A:
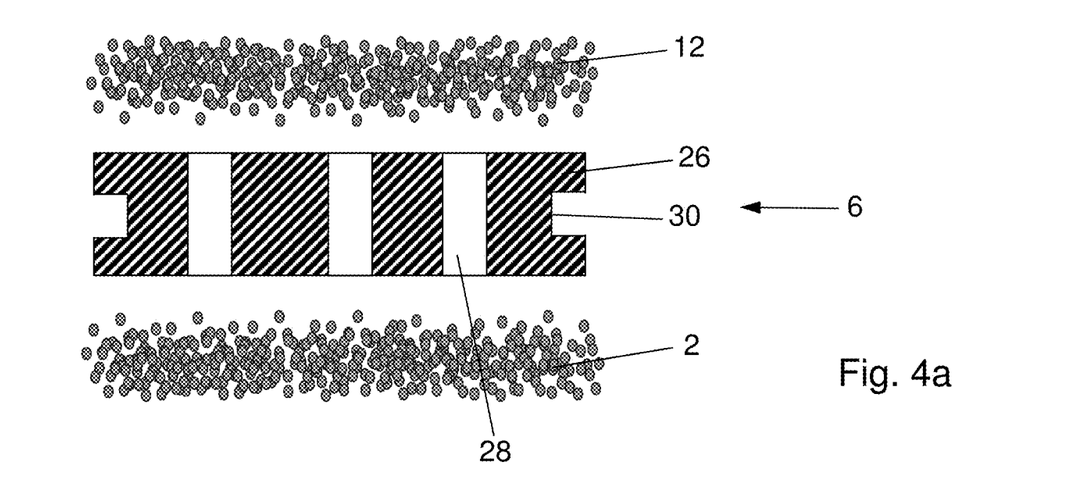
Figure 4B:
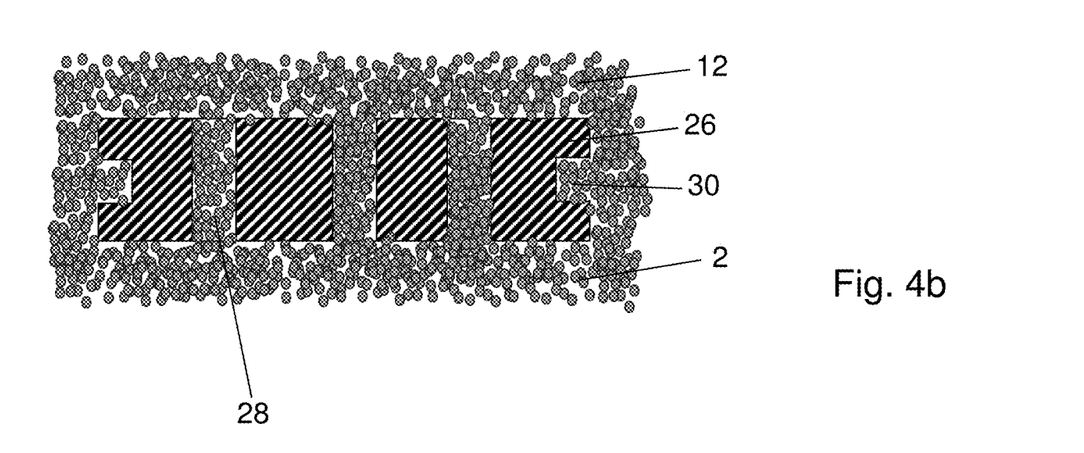
Figure 4C:
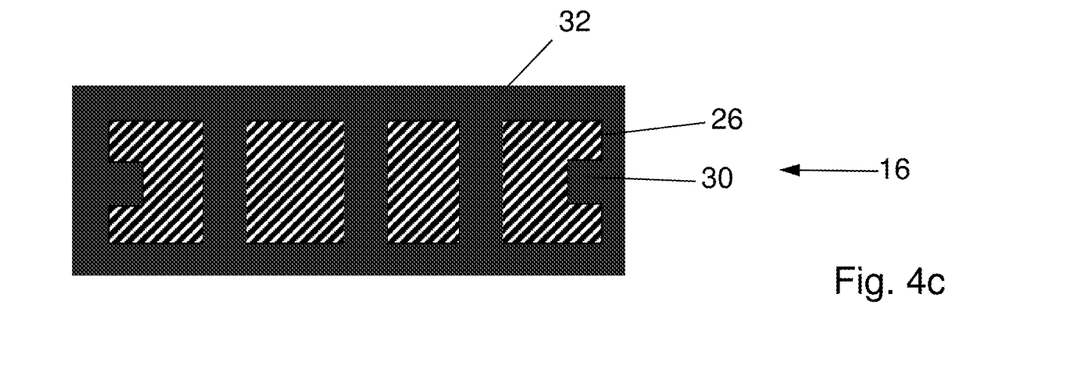

The example of FIG. 3 only differs from the example of FIG. 3 in that the upper skin 22 does not cover the entire uppers surface of core 16. Accordingly, the upper layer of UHMWPE powder is only applied as a patch 12a covering a part of the core element, and correspondingly, the upper skin is formed as a skin patch 22a. A substantially different embodiment is shown in FIG. 4. In this case, the core element 6 is constituted of a plate element 26 provided with a plurality of vertical passages 28 and a plurality of horizontal recesses 30 disposed in the lateral plate surface. After applying a first layer 2 of approximately 10 mm of UHMWPE powder, the core element 6 is placed thereon and then further UHMWPE powder is applied taking care to fill the vertical passages 28 and the horizontal recesses 30 and also forming an upper UHMWPE layer 12. After heat pressing and cooling, a composite part as shown if FIG. 5c is formed. A UHMWPE skin 32 completely sur-rounds the solid core 16, which is essentially identical to the originally inserted core element 6. Anchoring of the UHWMPE skin 32 to the core 16 is provided by the geometric structure formed by the vertical passages 28 and horizontal recesses 30.

Figure 5:
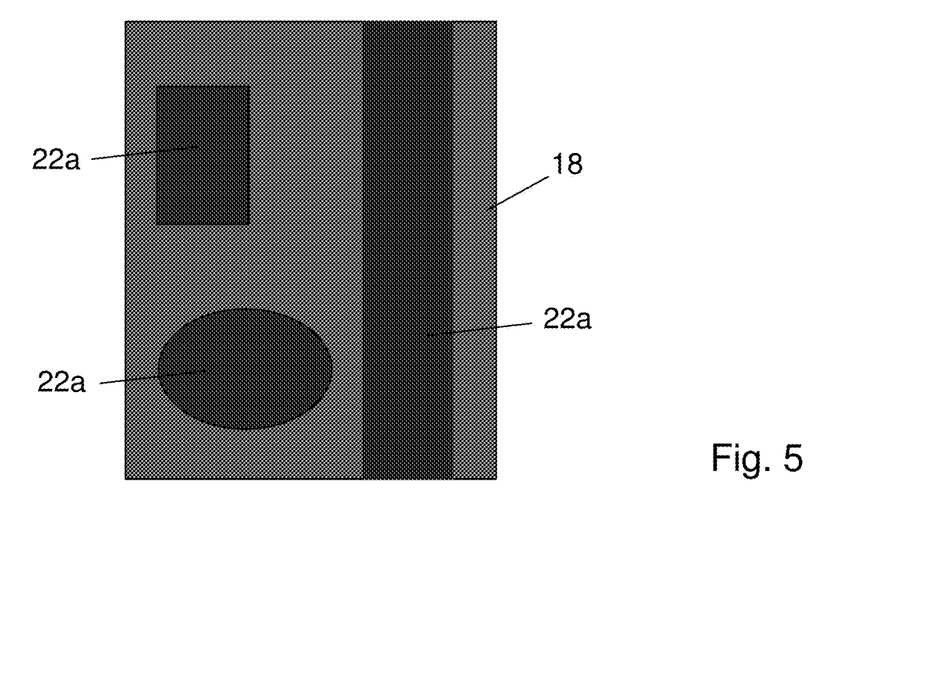
FIGS. 5 to 7 shows vertical section views of further embodiments of the composite part.
Figure 6:
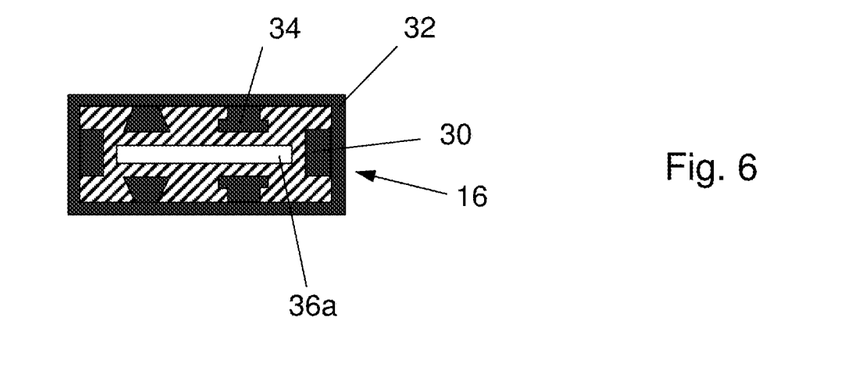
Figure 7:
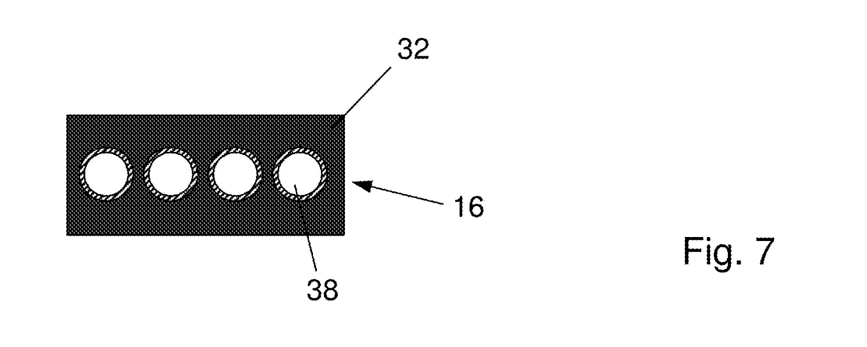

As already mentioned, various embodiments of the method and of the composite part are possible. FIG. 5 just shows one example of a composite part with a patchy UHMWPE skin, which can be shaped e.g. to provide low friction at selected, exposed regions 22a of the composite part. As shown in FIG. 6, a substantially solid core 16 with appropriate horizontal recesses 30 and vertical undercuts 34 can optionally contain an additional functional element 36. As shown in FIG. 7, the core 16 can be formed of a plurality of tubular elements 38 arranged substantially along a principal plane of the composite part. Mechanical anchoring between the skin matrix and the core is provided to some extent by the geometric arrangement of tubular elements 38. Nevertheless, it may be appropriate to provide further anchoring by applying a suitable adhesive on the surface of the tubular elements.

Figure 8:
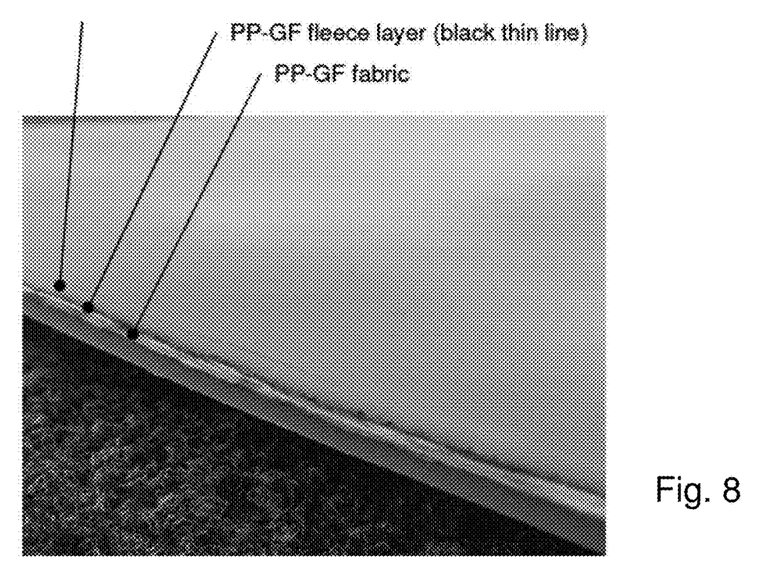
FIG. 8 shows a photographic reproduction of one embodiment of the composite part.
Figure 9:
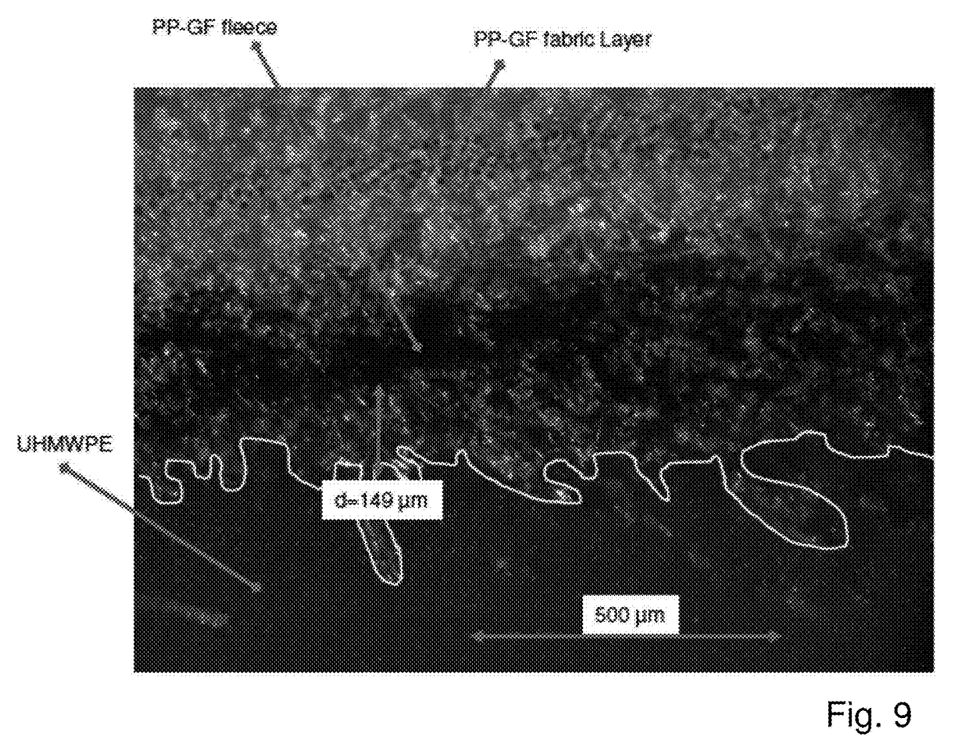
FIG. 9 shows an enlarged section (micrograph) of an edge region of the composite part of FIG. 8.

The composite part illustrated in FIGS. 8 and 9 comprises an upper UHMWPE skin layer and a bottom UHMWPE skin layer each consolidated to a skin thickness of about 2 mm. The core layer comprises an upper and a lower PP-GF fleece with approximately 50% GF content and each about 1 mm thick, and a stack of reinforcement PP-GF fabric layers sandwiched therebetween. A heat pressing was carried out starting from 25° C. and rising up to 200° C. under 20 bar pressure, After reaching 200° C. the pressure and temperature were maintained for 10 min, followed by a cooling from 200° C. to 70° C. still under 20 bar pressure. As seen from FIG. 8 and particularly from FIG. 9, the UHMWPE skin (bottom part of FIG. 9) intimately embeds various protruding structures of the PP-GF fleece, which in turn is anchored into the PP-GF fabric layer acting as reinforcement.

What is claimed is:

1. A method of manufacturing a composite part comprising a core, and two skins formed of a low-friction UHMWPE thermoplastic polymer with a single elevated temperature high pressure consolidation, the method comprising the following steps:
   a) providing a mold having upper and lower surfaces;
   b) producing a consolidatable fiber reinforced layup by the steps of
   b)i) introducing UHMWPE powder onto the lower surface of the mold;
   b)ii) introducing a lower nonwoven fleece core element with surfaces each having at least one contacting region comprising a plurality of anchoring sites, onto the UHMWPE powder introduced in step b)i);
   b)iii) optionally introducing one or more woven or non-woven fiber reinforcing layers containing glass fibers, basalt fibers, carbon fibers, aramid fibers, and mixtures thereof, as reinforcing fibers, wherein the one or more woven or non-woven fiber reinforcing layers further optionally comprise one or more thermoplastic fibers which melt and penetrate recesses and cavities of the one or more woven or non-woven reinforcing layers during consolidation in step c);
   b)iv) if at least one woven or non-woven fiber reinforcing layers has been added, selecting the one or more woven or non-woven fiber reinforcing layers such that an uppermost non-woven fleece with anchoring sites is present;
   b)v) introducing UHMWPE powder onto the nonwoven core element;
   c) consolidating the consolidatable fiber reinforced layup in the mold at an elevated temperature and a pressure of 20 to 60 bar to produce a consolidated fiber reinforced layup by causing UHMWPE to intermix with the anchoring sites; and
   d) cooling the consolidated fiber reinforced layup to solidify the skin polymer matrix to form a skin region mechanically engaged into the anchoring sites of the core element forming a composite part, and removing the composite part having a UHMWPE bottom skin and a UHMWPE top skin,
wherein the lower non-woven fleece of step b) ii) and non-woven fleece with anchoring sites of step b)iv) both comprise thermoplastic fibers.

2. The method of claim 1, wherein the consolidatable layup is subjected to vibration prior to step c) to cause UHMWPE powder to migrate into cavities proximate anchoring sites.

3. The method of claim 1, wherein the UHMWPE skin polymer powder is present patchwise on at least one surface of the composite part.

4. The method of claim 1, wherein the nonwoven core element comprises a nonwoven fleece of thermoplastic fibers and reinforcement fibers, wherein the nonwoven fleece has cavernous surface structures which act as the anchoring sites.

5. The method of claim 4, wherein the nonwoven fleece comprises nonwoven thermoplastic fibers as reinforcing fibers.

6. The method of claim 5, wherein the thermoplastic fibers are selected from the group consisting of polyphenylene sulfide fibers, polyetherimide fibers, polyetherether ketone fibers, polypropylene fibers, and mixtures thereof.

7. The method of claim 4, wherein the nonwoven fleece comprises inorganic reinforcing fibers and thermoplastic fibers which become molten at the elevated temperature of the consolidation step c).

8. The method of claim 7, wherein the inorganic reinforcing fibers are selected from the group consisting of basalt fibers, carbon fibers, glass fibers, and mixtures thereof.

9. The method according to claim 1, wherein consolidation is carried out at a temperature of 190 to 230° C.

10. The method of claim 1, wherein at least one optional woven or non-woven fiber reinforcing layer is present, and comprises a woven or unidirectional fiber reinforcement layer.

11. The method of claim 10, where two woven or unidirectional fiber reinforcement layers are present, and a further nonwoven fleece layer lies between the two woven or unidirectional reinforcement layers.

12. The method of claim 10, wherein at least one reinforcement layer is selected from fabric, multiaxial stitch or unidirectional reinforcement.

13. A method of manufacturing a composite part comprising a core and two skin regions formed of a low-friction UHMWPE thermoplastic polymer, the method comprising the following steps:
  a) providing a mold with a heatable mold cavity;
  b) loading into the mold cavity UHMWPE powder, followed by loading a core element which is a solid or hollow body having a surface with at least one contacting region provided with a plurality of anchoring sites which are recesses, rims or under-cuts in the solid or hollow body, and loading into the mold cavity UHMWPE powder over the core element, embedding the anchoring sites;
  c) applying a heat pressing step whereby the UHMWPE powder is melted to form a molten skin polymer matrix;
  d) cooling following heat pressing, whereby the melted UHMWPE solidifies to form a skin region mechanically engaged into the anchoring sites of the core element forming the core.

* * * * *